United States Patent [19]

Takishima et al.

[11] 4,363,540
[45] Dec. 14, 1982

[54] EXPOSURE INFORMATION STORAGE DEVICE FOR A PHOTOGRAPHIC CAMERA

[75] Inventors: Yoshiyuki Takishima, Yokohama; Yukio Mashimo, Tokyo; Masanori Uchidoi, Yokohama; Hiroshi Aizawa, Kawasaki, all of Japan; Bernhard H. Andresen; Robert C. Martin, both of Dallas, Tex.; Stephen C. Kwan, Plano, Tex.

[73] Assignees: Canon Kabushiki Kaisha, Tokyo, Japan; Texas Instruments Incorporated, Dallas, Tex.

[21] Appl. No.: 762,514

[22] Filed: Jan. 26, 1977

[30] Foreign Application Priority Data

Jan. 30, 1976 [JP] Japan .................................. 51-519074

[51] Int. Cl.³ ............................................. G03B 7/08
[52] U.S. Cl. .............................. 354/23 D; 340/347 M; 354/289
[58] Field of Search ............................. 354/23 D, 289; 340/347 M

[56] References Cited

U.S. PATENT DOCUMENTS

| 3,703,130 | 11/1972 | Watanabe | 354/23 D |
| 3,995,284 | 11/1976 | Kitauva et al. | 354/23 D |
| 4,054,887 | 10/1977 | Holle et al. | 354/23 D |
| 4,132,985 | 1/1979 | Kitauva | 354/23 D |
| 4,137,541 | 1/1979 | Mashimo et al. | 354/23 D |

Primary Examiner—Russell E. Adams
Attorney, Agent, or Firm—Toren, McGeady & Stanger

[57] ABSTRACT

A storage device for storing photographic exposure information employs a closed-loop analog-to-digital (A-D) converter circuit includes a counter and a digital-to-analog (D-A) converter. The influence of erroneous signals which are created at the output of the D-A converter when the exposure information is stored in the counter is eliminated. The D-A converter circuit employs a ladder network of coarse accuracy. The stored exposure value, however, is highly accurate because of the closed-loop nature of the A-D converter circuit. Means responsive to the stored value for operating the exposure system of the camera are disclosed.

8 Claims, 6 Drawing Figures $$R_n = \frac{1}{2^{n-1}} \cdot R_0$$

EXPOSURE INFORMATION STORAGE DEVICE FOR A PHOTOGRAPHIC CAMERA

BACKGROUND OF THE INVENTION

1. Field of the Invention

The present invention relates to an exposure information storage device for a photographic camera, and, more particularly, for such a storage device including an A-D converting means.

2. Description of the Prior Art

It is known in the prior art to electrically control exposure information, such as shutter and diaphragm information, in a photographic camera. For example, in the case of a timing circuit having an R-C time constant circuit, which is widely used for controlling the shutter time electronically, the closing operation of the shutter is effected as soon as the condenser is charged to a certain determined voltage. A photoconductive element, such as a CdS element is used as the resistance, R, or a photodiode with transistor is used equivalently, to supply information of the brightness of the object to be photographed. This type of exposure information control system requires that the light sensing element, such as a CdS element or photodiode, continues to receive the light beam from the object to be photographed while the shutter is in operation.

This conventional system cannot be employed, for example, in a single lens reflex camera in which the light sensing element receives the light beam through the lens. For such purpose, various storage devices have been proposed which enable exposure information such as brightness of the object to be electrically stored before taking a photograph. The exposure is set in accordance with this stored value.

Various kinds of exposure information storage devices have been proposed for such use. Some employ a condenser as a storage device. Others use a potentiometer to store the information by way of a mechanically controlled resistance element. Magnetic core devices are also used. These storage devices have the inherent deficiency that the storage operation is not fast enough. It is also difficult, in such devices, to store a very wide range of exposure information for a long time.

Considering the brightness of the object to be photographed as an exposure information, the light value range of the ordinary object is from LV−8 to LV+18, i.e., there are about 20 steps. The shutter speed and the aperture value also encompass a very wide range of values. The conventional storage device thus cannot react in a short time to store such a wide range of values.

Apart from the above mentioned storage devices, a storage device having an A-D converter has been proposed quite recently. In such device, a counter capable of high speed counting is used in the A-D converter. Thus, while the shortcomings of the conventional storage device can be eliminated, an erroneous signal is produced by the A-D converter when the converter is stepped up or down. Accordingly, in this device, an accurate storage operation cannot be carried out. To be more specific, the A-D converter usually contains a counter as its main part, which counter does not advance sufficiently quickly so that erroneous signals are transiently produced.

When the A-D converter is used as a storage device in a conventional way, the output of the light measuring circuit is converted from an analog value into a digital value so that the exposure is controlled based upon the number counted by the counter. It is necessary that the value counted by the counter be in accurate proportion to the output of the light measuring circuit. As a consequence, the value of the resistance in the ladder network used in the A-D converter must be designed with very high accuracy. Accordingly, the storage device becomes very expensive. This design also results in difficulties in the manufacturing of the converter which prevents its adoption in the exposure control circuit of the camera.

SUMMARY OF THE PRESENT INVENTION

It is an object of the present invention to provide an A-D storage device having high accuracy and error-free operation.

It is a further object of the present invention to provide a storage device for exposure information in a camera in which a digital-to-analog converter of coarse accuracy may be used.

It is an additional object of the present invention to provide a storage device for exposure information in a camera in which the effect of erroneous signals produced during the storage process is eliminated.

It is also an object of the present invention to provide an A-D storage device which is relatively simple to manufacture and more economic to produce.

It is another object of the present invention to provide an A-D storage device which provides a highly accurate output signal but employs circuit component values which may be of low accuracy so as to level itself to integrated circuit manufacture.

In accordance with the present invention, an exposure information storage device for a camera capable of storing exposure information supplied thereto comprises an exposure information producing means for providing an analog value corresponding to a supplied exposure information. An analog-to-digital (A-D) converter means is also included. The A-D converter means includes a pulse producing means for providing pulses having a predetermined period, a counter means for counting pulses from the pulse producing means, a digital-to-analog (D-A) conversion means for converting the content of the counter means into an analog electrical value and a comparator means for comparing the analog value from the D-A conversion means with the analog value from the exposure producing means for producing a completion signal when both analog values assume a predetermined relation with each other. The A-D converter means is responsive to the completion signal to terminate A-D conversion operation. A control circuit is coupled to the A-D converter means to control the A-D converter means to avoid responding to the output of the comparator means during the change of output of the D-A conversion means caused by the counting of pulses by said counter means.

Also in accordance with the present invention, an exposure information storage device for a camera capable of storing exposure information supplied thereto comprises an exposure information producing means for providing an analog value corresponding to a supplied exposure information. An analog-to-digital (A-D) converter means is also included. The A-D converter means includes a pulse producing means for providing pulses having a predetermined period, a counter means for counting pulses from the pulse producing means, a digital-to-analog (D-A) conversion means for converting the content of the counter means into an analog electrical value and a comparator means for comparing the analog value from the D-A conversion means for producing a completion signal when both analog values assume a predetermined relation with each other. The A-D converter means is responsive to the completion signal to terminate A-D conversion operation. The D-A converter is designed to provide an output which irregularly changes in the direction of the applied exposure information value.

For a better understanding of the present invention, together with other and further objects thereof, reference is made to the following description and accompanying drawings, and the scope of the present invention will be pointed out by the appended claims.

DESCRIPTION OF THE PRESENT INVENTION

The present invention will be explained in detail below with reference to the accompanying drawings, and will be directed toward an embodiment of a diaphragm control device for a single lens reflex camera.

Figure 1:
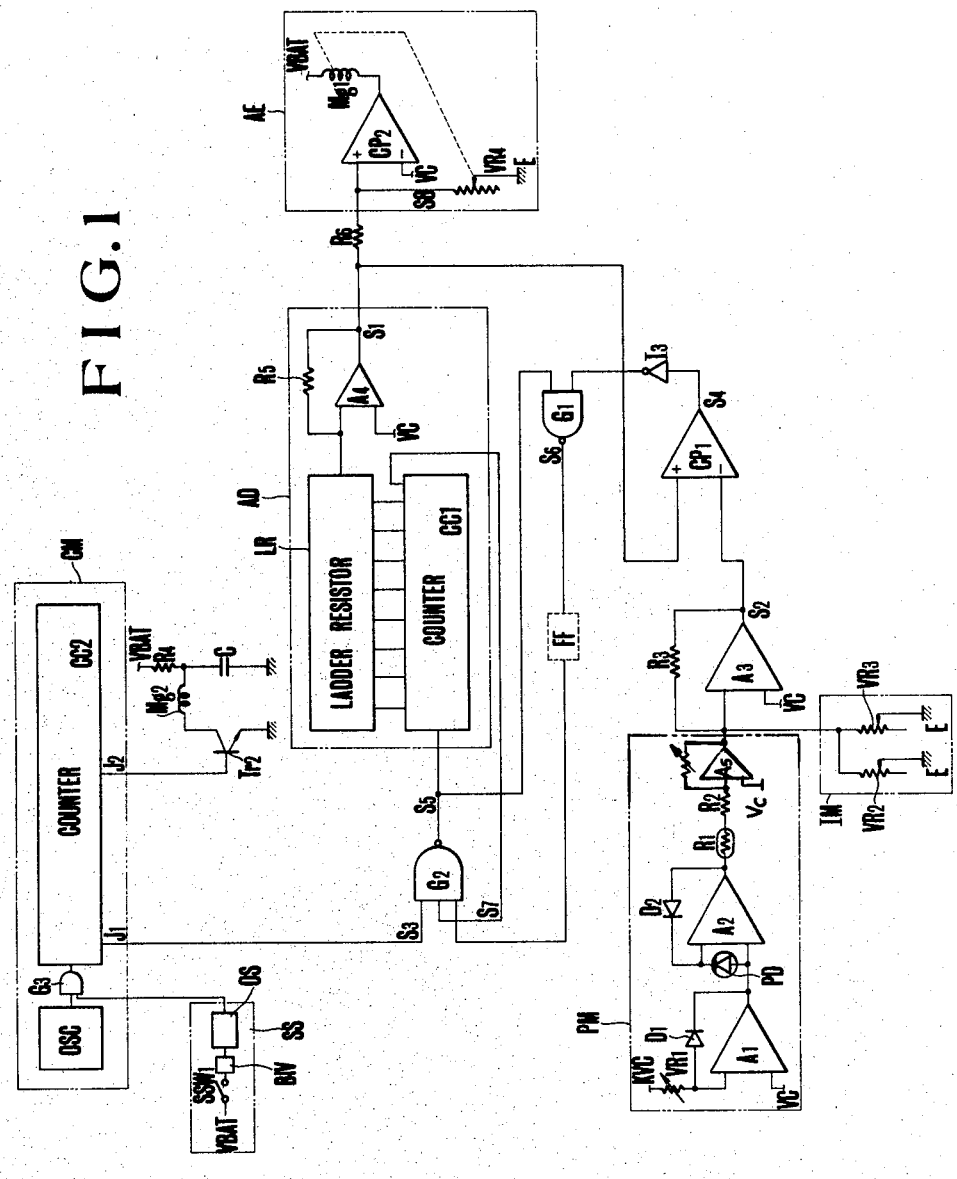
FIG. 1 illustrates an electrical circuit of the exposure control device for a single lens reflex camera, in accordance with the present invention.
Figure 2:
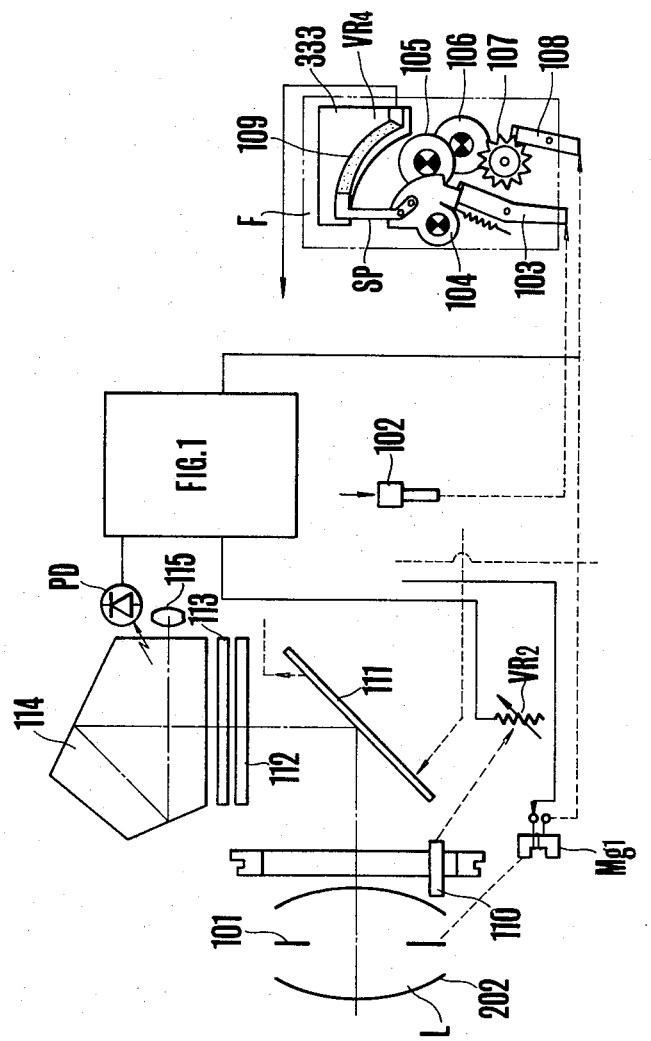
FIG. 2 shows the important parts of a camera, in which the circuit shown in FIG. 1 is to be adopted.

FIG. 1 shows a diaphragm control circuit built in the camera shown in FIG. 2, wherein PM is a light measuring circuit, IM an exposure information setting portion, CM a control pulse generating portion, AD is a major portion of an analog-digital converting circuit (which includes comparator $CP_1$) and AE a diaphragm control driving circuit.

The light measuring circuit PM includes the differential amplifiers $A_1$, $A_2$, the photodiode PD arranged on the pentagonal prism behind the photographic lens L, as is shown in FIG. 2, the logarithmic compression diodes $D_1$, $D_2$, the thermistor $R_1$ and the resistances $VR_1$ and $R_2$. The photoelectric current of the photodiode PD is logarithmically compressed by means of the differential amplifier $A_2$ and the diode $D_2$ connected in the feedback circuit and then applied to the amplifier $A_3$ via the converting amplifier $A_5$ input of the amplifier $A_3$ is connected in parallel with the shutter time and film sensitivity setting resistance $VR_2$ in the information setting portion IM. The input to amplifier $A_3$ is also in parallel with the variable resistance $VR_3$ for setting the calibration signal Avc for the interchangeable lens L for calibrating the vignetting error at the time of the light measurement with the maximum aperture value of the lens.

As a consequence, the output current of the amplifier $A_2$ is a signal corresponding to (Bv−Avo−Avc), where Avo is the calibration value of the brightness of the lens L and Bv the brightness of the object to be photographed, because the photodiode PD receives the light in the totally opened state of the diaphragm device 101 of the camera. The signal (Sv−Tv) of the shutter time and of the film sensitivity and the signal Avc are supplied to amplifier $A_3$ from the information setting portion IM. The output of the amplifier $A_3$ is the output signal ($S_2$=Bv−Avo+Sv−Tv). The amplifier $A_1$ in the light measuring circuit PM varies the bias to be applied to the photodiode by means of the level setting resistance $VR_1$ so that a part of the thermal change of the diode $D_2$ is compensated by making use of the change of the output bias potential due to the thermal change of $D_1$.

The control pulse generating portion CM includes the clock pulse oscillator OSC, the AND gate $G_3$ and the binary counter $CC_2$. The counter $CC_2$ has a divided clock pulse output terminal $J_1$ and a divided step down output terminal $J_2$. The dividing ratio of the divided output is set in advance, so that the output appears at the output terminal $J_2$ after the counter $CC_2$ has started. This is done so that the driving mechanism for driving the mirror and the diaphragm is actuated after the time necessary for measuring the light and the time necessary for the diaphragm setting member to move from the initial position to the position corresponding to the minimum aperture have elapsed.

The transistor $Tr_2$, the magnet $Mg_2$, and the condenser C are connected with the output terminal $J_2$ and form the release driving circuit of the shutter. When the counter output signal appears at the output terminal $J_2$, the transistor $Tr_2$ is brought into the conductive state. Then the electrical charge stored in the condenser is discharged through magnet $Mg_2$. This excites the magnet $Mg_2$ so that the shutter opening mechanism (not shown but which is in functional engagement with the magnet $Mg_2$) releases the shutter. SS shown in FIG. 1 is the starting signal generating circuit for generating the starting signal in functional engagement with the operation of the release button of the camera shown in FIG. 2, consisting of a differentiating circuit BIV and a one shot circuit OS.

The A-D converting portion AD includes the binary counter $CC_1$, the Ladder resistance network LR connected in parallel with the counter $CC_1$ and the differential amplifier $A_4$. The counter CC, and the Ladder network LR may be conventional units although a special feature of the ladder network which may be employed as part of the present invention will be described later. The output of the amplifier $A_4$ is connected to the input of the comparison circuit $CP_1$. $G_1$ and $G_2$ are respectively NAND gates forming a control circuit for eliminating an erroneous signal, which will be explained later in detail.

Elements AD, comparator $CP_1$ and gates $G_1$ and $G_2$ form a complete analog-digital (A-D) converter circuit. The output of amplifier $A_4$ is fed back to comparator $CP_1$ and compared with the exposure information signal which is the input to the A-D converter circuit. The stored information is available in digital form at the output of counter $CC_1$ and in analog form at the output of converter portion AD.

Figure 4:
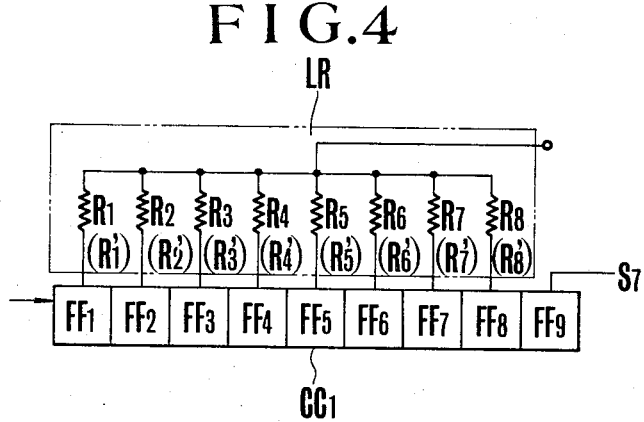
FIG. 4 illustrates the electrical circuit of an important portion of the circuit shown in FIG. 1.

FIG. 4 shows the counter $CC_1$ and the Ladder circuit constituting the D-A converting circuit, particularly an embodiment of the Ladder circuit for use in FIG. 1. The resistances $R_1$-$R_8$ are respectively connected to the output of each count step of the counter $CC_1$. $FF_1$-$FF_9$ are the flip-flops of the counter $CC_1$. With regard to the values of the resistances $R_1$−$R_n$−$R_8$, it is usually desirable that the relation $R_n=(1/2^{n-1})\cdot R_0$ is established (where $R_0$ is a fixed value). In the present embodiment, however, the resistances have the values $R'_1-R'_8$ which resistance values deviate somewhat from the above mentioned exponential relation. The relations between the conventional ladder network resistances $R_1-R_8$ and the resistances $R'_1-R'_8$ of the preferred embodiment are as follows.

$$R_1 = R_0 \geqq R'_1$$

$$R_2 = \tfrac{1}{2}R_0 \geqq R'_2$$

$$R_3 = \tfrac{1}{4}R_0 \geqq R'_3$$

$$R_4 = \tfrac{1}{8}R_0 \geqq R'_4$$

$$R_5 = 1/16 R_0 \geqq R'_5$$

$$R_6 = 1/32 R_0 \geqq R'_6$$

$$R_7 = 1/64 R_0 \geqq R'_7$$

$$R_8 = 1/128 R_0 \geqq R'_8$$

For resistances $R'_1-R'_8$, resistances having values respectively different from or nearly equal to those of the resistances $R_1-R_8$ are used. These resistance values are arranged in a manner similar to those of the resistances $R_1-R_8$ which are in a precise exponential relation with respect to one another. It is not, however, necessary to select the resistances so that the values satisfy the above mentioned exponential relation exactly.

Figure 5:
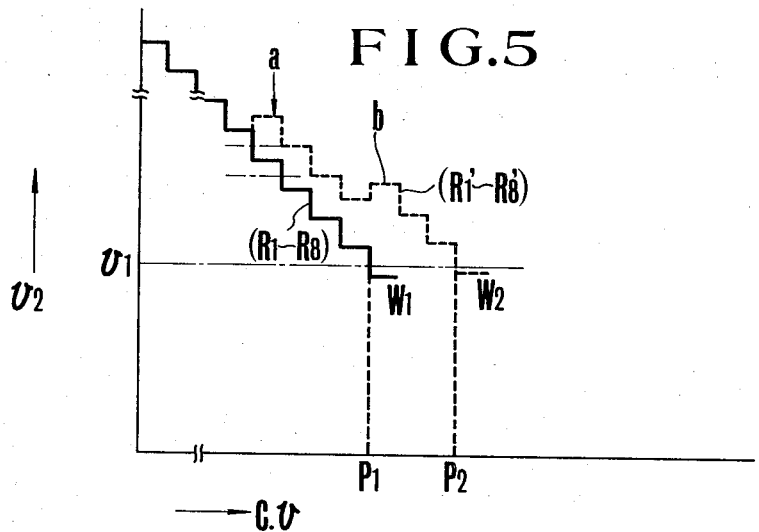
FIG. 5 shows a graphical representation for explaining the wave forms of the circuit shown in FIG. 4.

FIG. 5 shows a comparison between the output voltage characteristics of the A-D conversion circuit in which the resistances $R_1-R_8$ are used and the output voltage characteristics of the A-D conversion circuit in which the resistances $R'_1-R'_8$ are used. The resistances $R'_1-R'_8$ do not have values with exponential relation among one another as exist for resistances $R_1-R_8$. The ladder network employing the $R_1-R_8$ values has regular voltage steps with each count of the counter as indicated by curve $W_1$. As is shown at the points a and b of curve $W_2$, the voltages are not decreased by a certain determined amount when employing resistances $R'_1-R'_8$ whose values do not satisfy the exponential relation. However, the values of the resistances $R'_1-R'_8$ constituting the Ladder resistance network are gradually decreased, although with irregularity, so that the output of the A-D conversion circuit is also gradually decreased until it reaches a certain determined value $v_1$. At the time corresponding to value $v_1$, the counting is stopped as mentioned above. Although when curve $W_2$ is compared with curve $W_1$, the time for the output to reach $v_1$ is a little delayed, it is possible to obtain a desired A-D conversion efficiency.

The significant advantages obtained by using resistances whose values do not satisfy the exponential relation are the simplification in the manufacturing of the A-D conversion circuit, the reduction in the number of the manufacturing processes and the reduction of the faulty products due to the rougher accuracy of each resistance. This results in great economic savings. This is particularly apparent in integrated circuit manufacture. The accuracy of the conventional network resistance $R_1-R_8$ must be within 0.39%, while in the case of the $R'_1-R'_8$ network, the acceptable accuracy can be more than several times as large.

In FIG. 1, the driving circuit AE is composed of the comparison circuit $CP_2$, the magnet $Mg_1$ for controlling the diaphragm setting member and the variable resistance $VR_4$. As is shown in FIG. 2, the diaphragm setting mechanism includes the stop disengaging member 103 in functional engagement with the release member 102 for starting of the camera, the rotary disc 104 energized clockwise by means of a spring, the step-up gears 105 and 106 in engagement with the geared segment formed along the circumference of the rotary disc 104, the gear 107 and the armature 108 of the above mentioned magnet $Mg_1$.

Figure 6:
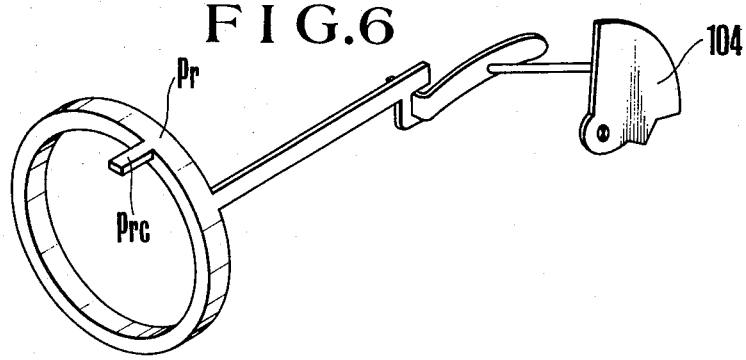
FIG. 6 shows the aperture preset mechanism of the camera of FIG. 2 for operation with the circuit shown in FIG. 1.

On the rotary disc 104, a slidable contact SP is fastened so that the contact SP is in slidable and elastic contact with the segment resistance 109 provided on the fixed frame of the camera. Variable resistance $VR_4$ is composed of the resistance 109 and the slidable contact SP. Rotary disc 104 is, as is shown in FIG. 6, in functional engagement with the preset ring cam Pr of the diaphragm device in the interchangeable lens L. With the rotation of the disc 104, the preset cam which controls the aperture value with rotation amount also rotates so as to set the cam setting position, and preset the aperture value. Since this arrangement is not directed toward the present invention, a detailed explanation is omitted.

In FIG. 2, 110 is the above mentioned Avc compensating pin which is provided on the surface at the rear end of the interchangeable lens. Mounting of the lens L sets the above mentioned variable resistance $VR_2$. 111 is the movable mirror, 112 the focus plate, 113 the Fresnel lens, 114 the pentagonal prism and 115 the eye piece.

The operation of this arrangement will be explained below.

When the interchangeable lens L is mounted on the camera body and the member at the side of the camera (not shown in the drawing) is wound up, the condition shown in FIG. 2 is achieved. The sensitivity of the film to be used and the shutter speed correspond to the exposure values are set on the variable resistances. The resistance $VR_2$ present the values set by means of the pin 110. Now supposing that the current source switch (not shown in the drawing) is closed and each circuit is ready for operation. When the release member 102 of the camera is pushed down to the first step, the switch $SSW_1$ will close and the differentiating circuit will operate to actuate the one shot circuit. Accordingly, the start signal generating circuit SS will generate the starting signal as an output so as to open the gate $G_3$ (FIGS. 1, 3, 5) so that the clock pulses generated by the clock pulse generating means OSC will be applied to the counter $CC_2$. Thus, the clock pulses will then be applied to the NAND gate $G_2$ from the output terminal $J_1$.

Figure 3:
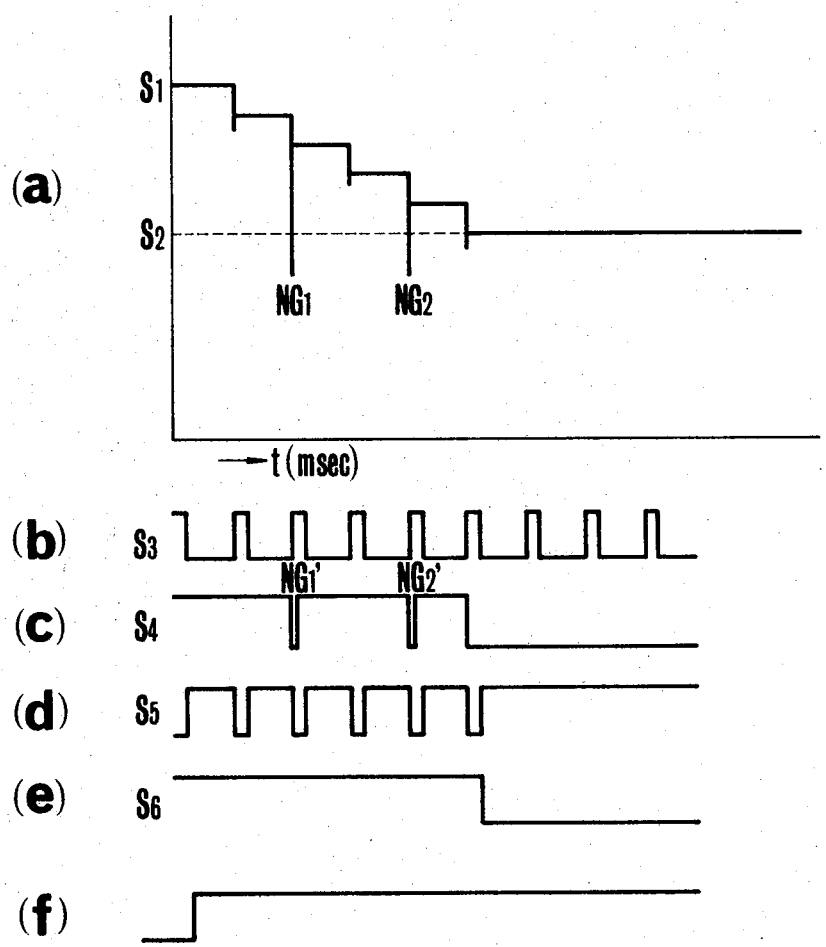
FIG. 3 shows relevant waveforms representing the signals of the circuit of FIG. 1.

Further, it should be noted that at this time the counter $CC_1$ has already been preset when the current source switch closed so that the end signal $S_7$ will be at high level, namely "1". In the initial state, the output of the Ladder circuit LR provides a high potential so that the output $S_4$ of the comparison circuit $CP_1$ is "1". In consequence, the output of the inverter $I_3$ will be at low level, namely "0". Consequently, the output $S_6$ of the NAND gate $G_1$ will be "1" while the output $S_5$ and $G_2$ then provides the inverted pulses of $S_3$ as is shown in FIG. 3 and the output $S_5$ is then transmitted to the counter $CC_1$. Thus, the counter $CC_1$ counts down by means of the pulse signal $S_5$, so that the output of the Ladder circuit LR is converted into the step-shaped wave as is shown by $S_1$ in FIG. 3(a) every time a pulse $S_5$ is applied to the counter $CC_1$.

At the time the output value of $S_1$ is changed, i.e. when the counter $CC_1$ counts the pulses as described, the erroneous signals, e.g. Glitch signals $NG_1$ and $NG_2$, are produced as is shown in FIG. 3(a). These mix with signals $S_4$ as $NG'$ and $NG'_2$ as is shown in FIG. 3(c). Thus, the outputs of the comparison circuit, which are the count stop signals, cannot be distinguished from the above signals $NG'_1$, $NG'_2$ in the conventional A-D conversion circuit. Accordingly, in such circuit the counter will stop counting causing misoperation.

In contrast, the embodiments of the present invention apply the above signals to the NAND gate $G_1$ together with the signal $S_5$. The signal $S_5$ always becomes "0" when the Glitch signal is produced so that the output $S_6$ of the NAND gate $G_1$ is free from the effect of signals $NG'_1$, $NG'_2$. Thus, the count operation is maintained, never having been disturbed by the Glitch signal.

When, during the process of the counting operation in this way, the output $S_1$ of the amplifier $A_4$ coincides with the output $S_2$ of the amplifier $A_3$, i.e., when the aperture value signal $S_2$ for obtaining the proper exposure coincides with the instantaneous brightness of the object to be photographed, the present shutter time, the present film sensitivity and so on, the output signal $S_4$ of the comparison circuit will be inverted to "0". A "1" will continue to be applied to one input terminal of the NAND gate $G_1$ through the inverter $I_3$ so that from the instant that $S_5$ becomes "1", $S_6$ will become "0". The output of the NAND gate $G_2$ is also maintained in a "1" state so that the counter $CC_1$ stops counting. The proper aperture value information corresponding to the brightness of the object to be photographed and so on is digitally stored in the counter so as to provide $S_1$ as an analog value equal to the value of $S_2$.

After the information is stored in the counter when the output $S_1$ of the amplifier $A_4$ is made equal to $S_2$, by pushing the release member 102 down to the second step, the stopping member 103 disengages the rotary disc 104. The disc 104 starts to rotate clockwise by means of the strength of a spring so that the value of the resistance will gradually decrease from its maximum value. The analog signal $S_1$ corresponds to the information of the proper aperture value for the information of the brightness of the object to be photographed and so on, which is stored in counter $CC_1$ by means of the above mentioned light sensing means. The magnet $Mg_1$ will be excited by the output from the computer $CP_2$ and move the slide of potentiometer $VR_4$ until the non-inverting input to the comparison $CP_2$ coincides with the bias signal $VC$ of the other input of the comparison circuit. The armature 108 will then hold the gear 107 so as to stop the rotation of the rotary disc 104. The preset cam Prc of the lens L will then be preset at a certain determined position.

By further pushing the release member down to the third step, the conventional release mechanism (not shown in the drawing) will start to operate to release the driving mechanism of the mirror 111 and that of the diaphragm 101 of the lens L so that the mirror will be raised and the aperture set at the proper value by means of the present cam Prc (set in advance). Then the transistor $Tr_2$ will be brought into its conductive state by means of the output $J_2$ of the counter so as to excite the magnet $Mg_2$ to release the shutter. The shutter will then open with the set shutter time, by means of a conventional electronic shutter circuit (not shown in the drawing). The shutter will close to complete the taking of the photograph.

Further in accordance with the present invention, a storage means is employed as an A-D converter so that the information corresponding to the brightness of the object to be photographed is stored in the counter $CC_1$ while the analog voltage which is the output of the A-D converter circuit is made to correspond to the output of the amplifier $A_3$. In other words, the analog output of the light measuring operation circuit controls the exposure in accordance with the analog output of the A-D converter circuit. It is, therefore, not necessary for the control to be carried out in accordance with the value counted by the counter, as in case of the conventional control circuit and it is not necessary that the value counted by the counter should precisely correspond to the output of the light measuring operation circuit (the value counted by the counter need not be made to vary in a certain proportion to the output of the amplifier $A_4$ as in the aforementioned case).

Thus, as is taught by the present invention, if the analog output of the A-D converter circuit is made to coincide with the output of the light measuring circuit, while the output of the Ladder circuit is only decreased or increased along with the count operation of the counter, it is sufficient for the value counted by the counter to be simply an increasing function or a decreasing function with reference to the output of the light measuring circuit. This is so because the values counted by the counter are not used for accurate control and it is not necessary for the Ladder circuit to produce an output exactly in the exponential relation to the value counted by the counter as in the conventional case. Accordingly, resistances having coarse accuracy can be used so that the manufacturing cost can be remarkably reduced. This is particularly important in integrated circuit manufacture.

It should also be noted that the output of the gate $G_1$ can be connected to a Latch circuit such as flip-flop FF (as is shown in dotted line representation). Thus, when a step-up counter is employed instead of counter $CC_1$, the same effect can be obtained by connecting an inverter Iv to the output of the comparison circuit $CP_1$.

An A-D circuit converter for use as a device has been described which provides long-time storage and is able to handle a wide range of input information values. The storage device is also quite free from the influence of the erroneous signals which are inherent in such A-D converter circuits. The D-A portion can be manufactured with resistances having coarse accuracy.

While the foregoing description and drawings represent the preferred embodiments of the present invention, it will be obvious to those skilled in the art that various changes and modifications may be made therein without departing from the full spirit and scope of the present invention.

What is claimed is:

1. An exposure information storage device for a camera capable of storing exposure information supplied thereto comprising:
   (a) an exposure information producing means for providing an analog value corresponding to a supplied exposure information;
   (b) an analog-to-digital converter means, said means including a pulse producing means for providing pulses having a predetermined period, a counter means for counting pulses from said pulse producing means, a digital-to-analog conversion means for converting the content of said counter means into an analog electrical value, a comparator means for comparing the analog value from the exposure information producing means with the analog electrical value from the digital-to-analog conversion means for producing a completion signal when both analog values assume a predetermined relation with each other, said analog-to-digital converter means being responsive to said completion signal so as to terminate the analog-to-digital conversion operation; and (c) a control circuit coupled to the analog-to-digital converter means, said circuit for controlling the analog-to-digital converter means to avoid responding to the output of the comparator means during the change of the output of the digital-to-analog conversion means caused by the counting of pulses by said counter means.

2. An exposure information storage device for a camera capable of storing the exposure information supplied thereto comprising:

(a) an exposure information producing means for providing an analog value corresponding to a supplied exposure information;

(b) a pulse generating means for producing pulses at a predetermined period;

(c) a counter means for counting pulses from the pulse producing means;

(d) a digital-to-analog conversion means responsive to said counter means for providing an analog electrical value representative of the content of the counter;

(e) a comparator means for comparing the analog value from the exposure information producing means with the analog electrical value from the digital-to-analog conversion means, the output of said comparator means being changed from a first signal to a second signal when both analog values reach a predetermined relation with each other;

(f) a transmitting means for transmitting the pulses from the pulse producing means to the counter means in response to the first signal and for prohibiting the transmission of the pulses from the pulse producing means to the counter means in response to the second signal; and (g) a control circuit coupled to the transmitting means, said circuit for applying an independent signal from the output of the comparator means to the transmitting means corresponding to the first signal for a certain determined time in synchronization with said pulses.

3. An exposure information storage device for a camera capable of storing the exposure information supplied thereto comprising:

(a) an exposure information producing means for providing an analog value corresponding to a supplied exposure information;

(b) a pulse generating means for producing pulses at a predetermined period;

(c) a counter means for counting pulses from the pulse producing means;

(d) a digital-to-analog conversion means responsive to said counter means for providing an analog electrical value representative of the content of the counter;

(e) a comparator means for comparing the analog value from the exposure information producing means with the analog electrical value from the digital-to-analog conversion means, the output of said comparator means being changed from a first signal to a second signal when both analog values reach a predetermined relation with each other;

(f) a transmitting means for transmitting the pulses from the pulse producing means to the counter means in response to the first signal and for prohibiting the transmission of the pulses from the pulse producing means to the counter means in response to the second signal; and (g) a control circuit coupled to the transmitting means for applying a signal corresponding to the first signal to the transmitting means for a predetermined time in synchronism with said pulses independently of the output of the comparator means.

4. An exposure information storage device for a camera in accordance with claim 2 or 3, wherein said control circuit includes a logic circuit having a NAND construction.

5. An exposure information storage device for a camera in accordance with claim 2 or 3, wherein the exposure information producing means includes a light measuring circuit for providing an analog output corresponding to the brightness of the object to be photographed.

6. An analog-to-digital converter circuit for storing an analog input signal supplied thereto comprising:

means for providing an analog input signal for storage;

means for providing pulses;

a counter responsive to said pulse providing means for counting pulses;

digital-to-analog conversion means for converting the content of the counter into an analog output signal;

a control circuit for terminating the pulse counting operation of the counter and having a comparator responsive to the analog input signal and the digital-to-analog output signal for providing a completion signal to terminate the pulse counting operation of said counter when said two analog signals are related in a predetermined manner and a control means to prevent the count stopping operation by the control circuit during changing of the output of the digital-to-analog conversion means at the time of pulse counting by the counter.

7. An analog-to-digital conversion device for a camera comprising:

(a) an exposure information producing circuit for providing an analog output corresponding to a supplied exposure information;

(b) a pulse producing circuit for forming pulses;

(c) an analog-to-digital conversion circuit including a counter means for counting the pulses, a digital-to-analog conversion means for converting a content of the counter means into an analog value, detecting means for detecting the analog value and the analog output and producing a signal for stopping the count operation of the counter means when the analog value and the analog output reach a predetermined relation;

(d) preventive means for avoiding the stopping of the count operation with the signal from the detecting means due to temporary changes in the output of the digital-to-analog conversion means during counting by the counter means.

8. An analog-to-digital conversion circuit according to claim 6, wherein the control means nullifies the completion signal from the comparator when changing the output of the digital-to-analog conversion means.

* * * * *